US012565053B2

(12) United States Patent
Kurasawa

(10) Patent No.: US 12,565,053 B2
(45) **Date of Patent: *Mar. 3, 2026**

(54) PRINTING APPARATUS, CONTROL METHOD THEREFOR, AND STORAGE MEDIUM

(71) Applicant: CANON KABUSHIKI KAISHA, Tokyo (JP)

(72) Inventor: Kanto Kurasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,638

(22) Filed: Apr. 28, 2023

(65) Prior Publication Data

US 2023/0264502 A1 Aug. 24, 2023

Related U.S. Application Data

(63) Continuation of application No. 17/346,097, filed on Jun. 11, 2021, now Pat. No. 11,667,141.

(30) Foreign Application Priority Data

Jun. 30, 2020 (JP) ................................ 2020-113352

(51) Int. Cl.
*B41J 29/393* (2006.01)
*B41J 2/01* (2006.01)

(52) U.S. Cl.
CPC ........ *B41J 29/393* (2013.01); *B41J 2002/012* (2013.01); *B41J 2029/3935* (2013.01); *B41J 2203/01* (2020.08)

(58) Field of Classification Search
CPC .............. B41J 29/393; B41J 2029/3935; B41J 2203/01; G01N 2021/8663; G01N 33/343
See application file for complete search history.

(56) References Cited

U.S. PATENT DOCUMENTS 11,667,141 B2 * 6/2023 Kurasawa .............. B41J 29/393
347/14

FOREIGN PATENT DOCUMENTS

JP 2001171098 A 6/2001
JP 2012126111 A 7/2012

* cited by examiner

*Primary Examiner* — Yaovi M Ameh
(74) *Attorney, Agent, or Firm* — Canon U.S.A., Inc. IP Division

(57) ABSTRACT

A printing apparatus acquires characteristic information about a recording medium and executes a light quantity adjustment in a reading operation using a reading unit based on the acquired characteristic information. By using the above-described configuration, it is possible to prevent an increase in the number of processes for analyzing read data obtained by reading a test pattern.

12 Claims, 11 Drawing Sheets

PRINTING APPARATUS, CONTROL METHOD THEREFOR, AND STORAGE MEDIUM

This application is a continuation of U.S. patent application Ser. No. 17/346,097, filed on Jun. 11, 2021, which claims the benefit of Japanese Patent Application No. 2020-113352, filed Jun. 30, 2020, each of which are hereby incorporated by reference herein in its entirety.

BACKGROUND

Field of the Disclosure

The present disclosure relates to a printing apparatus for printing an image on a recording medium, a control method therefor, and a storage medium.

Description of the Related Art

An inkjet printing apparatus provided with a so-called full-line printhead having a print width corresponding to the width of a recording medium to be used is known. The inkjet printing apparatus including such a printhead can print an image on substantially the entire surface of a recording medium by moving the printhead once relatively to the recording medium.

In a printing apparatus using a full-line printhead, an error can occur in the mounting position of each printhead, or in relative mounting positions of a plurality of printheads. This error causes a deviation in the landing position of an ink droplet on a recording medium, which may lead to a deterioration in printing quality.

An adjustment process for correcting such a deviation in the landing position of an ink droplet is known. This adjustment process is herein referred to as a print position adjustment. The print position adjustment includes a dynamic print position adjustment to be performed during a printing operation to adjust an error that occurs during the printing operation continuously performed, and a static print position adjustment to be performed as an apparatus maintenance operation at a timing when the printing operation is not performed.

In the print position adjustment, an image printed on a recording medium is read and the landing positions of ink droplets and an image failure are detected, thereby reflecting the detection result in the subsequent printing operation. A print position adjustment method discussed in Japanese Patent Application Laid-Open No. 2013-197860 includes a correction unit for carrying out gray scale correction on each pixel of read image data based on properties of a recording medium (recording material).

SUMMARY

According to an aspect of the present disclosure, a printing apparatus includes a printing unit configured to print an image by applying a recording material to a recording medium, a data acquisition unit configured to acquire read data of a test pattern printed on the recording medium by a reading operation for reading, by a reading unit, reflected light of light irradiated on the recording medium from a light source, and a control unit configured to control image printing by the printing unit based on the read data acquired by the data acquisition unit. The printing apparatus further includes an adjustment unit configured to acquire characteristic information about the recording medium on which the test pattern is printed, and to adjust at least one of a quantity of light irradiated from the light source and a quantity of light for reading the test pattern by the reading unit based on the acquired characteristic information.

Further features of the present disclosure will become apparent from the following description of exemplary embodiments with reference to the attached drawings.

DESCRIPTION OF THE EMBODIMENTS

Figure 1:
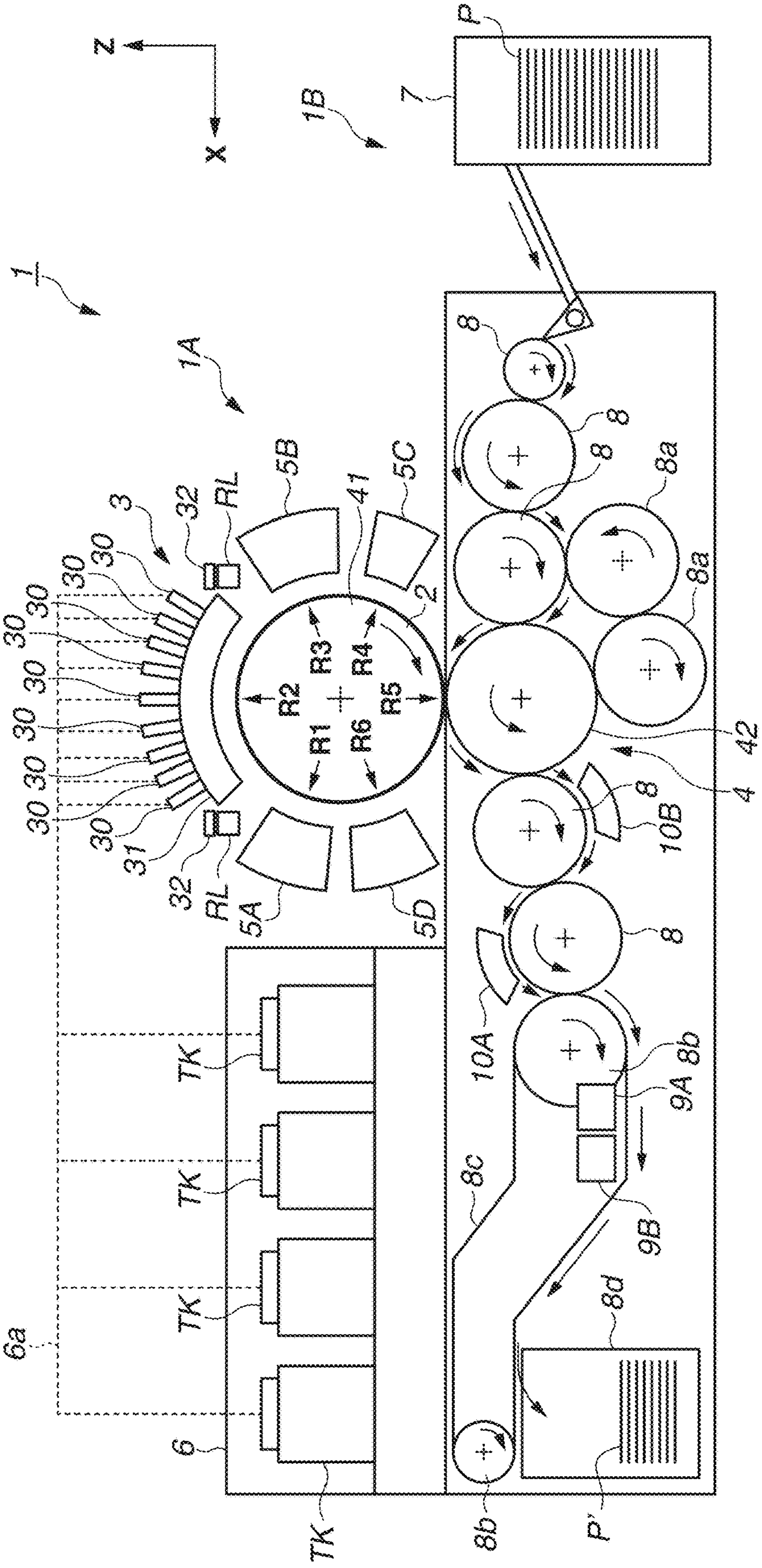
FIG. 1 schematically illustrates a printing system according to one or more aspects of the present disclosure.

An exemplary embodiment of the present disclosure will be described below with reference to the drawings.

In the drawings, directions indicated by arrows X and Y, respectively, indicate a horizontal direction, and the X-direction and the Y-direction are perpendicular to each other. A direction indicated by an arrow Z indicates a vertical direction.

<Printing System>

FIG. 1 is a front view schematically illustrating a printing system 1 according to an exemplary embodiment of the present disclosure. The printing system 1 is a sheet-fed type inkjet printer that transfers an ink image onto a recording medium P through a transfer member 2, thereby producing a printed matter P'. The printing system 1 includes a printing apparatus 1A and a conveyance apparatus 1B. In the present exemplary embodiment, the X-direction, the Y-direction, and the Z-direction indicate a width direction (overall length direction), a depth direction, and a height direction, respectively, of the printing system 1. The recording medium P is conveyed in the X-direction.

The term "printing" used herein refers not only to formation of significant information, such as characters and figures, but also to formation of a wide variety of objects, such as an image, a design, and a pattern, on a recording medium, or processing of media, regardless of whether it is significant. Not only objects that are visualized so that the objects can be visually perceived by a human, but also objects other than visualized objects can be treated. In the present exemplary embodiment, assume that sheet-like paper is used as a "recording medium". However, cloth, plastic, a film, and the like may also be used.

Ink components are not particularly limited. In the present exemplary embodiment, assume that aqueous pigment ink including a pigment as a coloring material, water, and resin is used.

<Printing Apparatus>

The printing apparatus 1A includes a printing unit 3, a transfer unit 4, peripheral units 5A to 5D, and a supply unit 6.

<Printing Unit>

Figure 2:
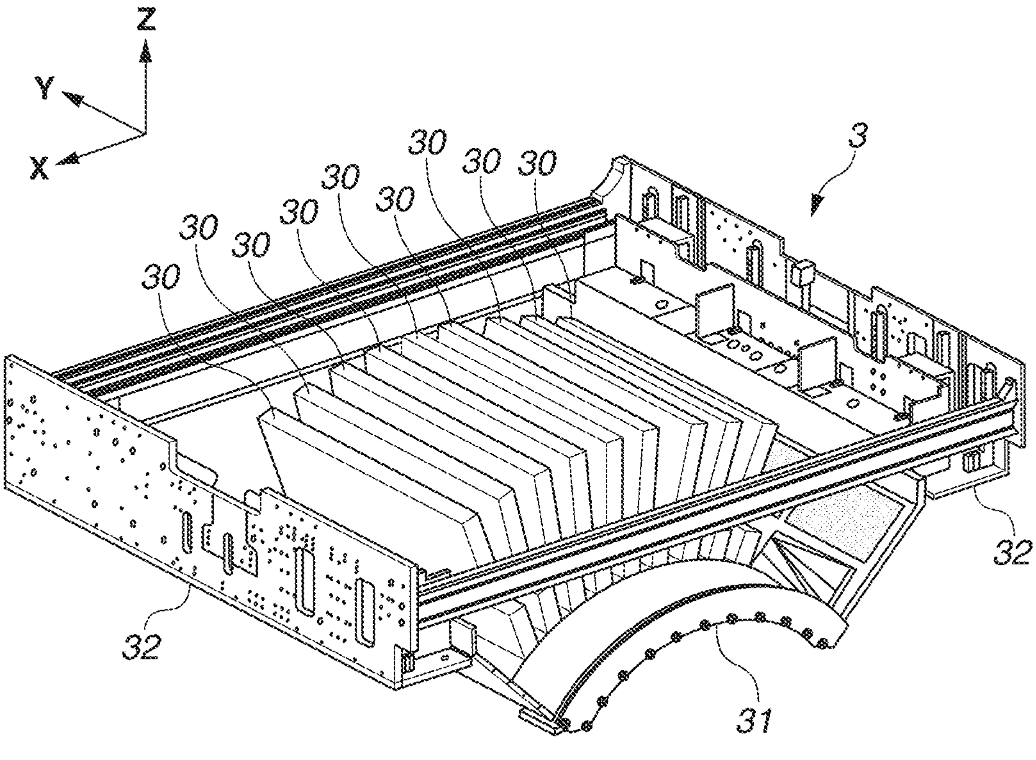
FIG. 2 is a perspective view illustrating a printing unit.

The printing unit 3 includes a plurality of printheads 30 and a carriage 31. The printing unit 3 will now be described with reference to FIGS. 1 and 2. FIG. 2 is a perspective view of the printing unit 3. Each printhead 30 ejects liquid ink to the transfer member 2 to form an ink image as a print image on the transfer member 2.

In the present exemplary embodiment, each printhead 30 is a full-line head extending in the Y-direction that intersects with the X-direction in which the recording medium P is conveyed. Nozzles are arranged in a range covering the width of an image printing area on an available maximum-size recording medium. Each printhead 30 includes an ink ejection surface from which a nozzle is opened, and the ink ejection surface is formed on a lower surface of the printhead 30. The ink ejection surface is opposed to the front surface of the transfer member 2 through a small gap (e.g., several mm). In the present exemplary embodiment, the transfer member 2 is configured to move cyclically on a circular orbit, and thus the plurality of printheads 30 is radially arranged.

Each nozzle is provided with an ejection element. The ejection element is, for example, an element for generating a pressure in the nozzle to eject ink stored in the nozzle. A known technique for an inkjet head of an inkjet printer can be applied. Examples of the ejection element include an element for causing film boiling in ink to form air bubbles using an electro-thermal transducer to thereby eject ink, an element for ejecting ink using an electro-mechanical transducer, and an element for ejecting ink using static electricity. In terms of high-speed, high-density printing, an ejection element using an electro-thermal transducer can be used.

In the present exemplary embodiment, nine printheads 30 are provided. The printheads 30 eject different types of ink from each other. Examples of different types of ink include ink containing different coloring materials, such as yellow ink, magenta ink, cyan ink, and black ink. A single printhead 30 is configured to eject one type of ink, but instead may be configured to eject a plurality of types of ink. In the configuration in which the plurality of printheads 30 is provided as described above, some of the printheads 30 may be configured to eject ink containing no coloring material (e.g., clear ink).

The carriage 31 supports the plurality of printheads 30. An end of each printhead 30 located closer to the ink ejection surface is fixed to the carriage 31. With this configuration, a gap between the ink ejection surface and the surface of the transfer member 2 can be accurately maintained. The carriage 31 is configured to be guided by a pair of guide members RL so as to be displaceable while mounting the printheads 30. In the present exemplary embodiment, the pair of guide members RL is a rail member extending in the Y-direction and is spaced apart from each other in the X-direction. Slide portions 32 are provided at respective side portions in the X-direction of the carriage 31. The slide portions 32 engage with the guide members RL, and are slidable in the Y-direction along the guide members RL.

Figure 3:
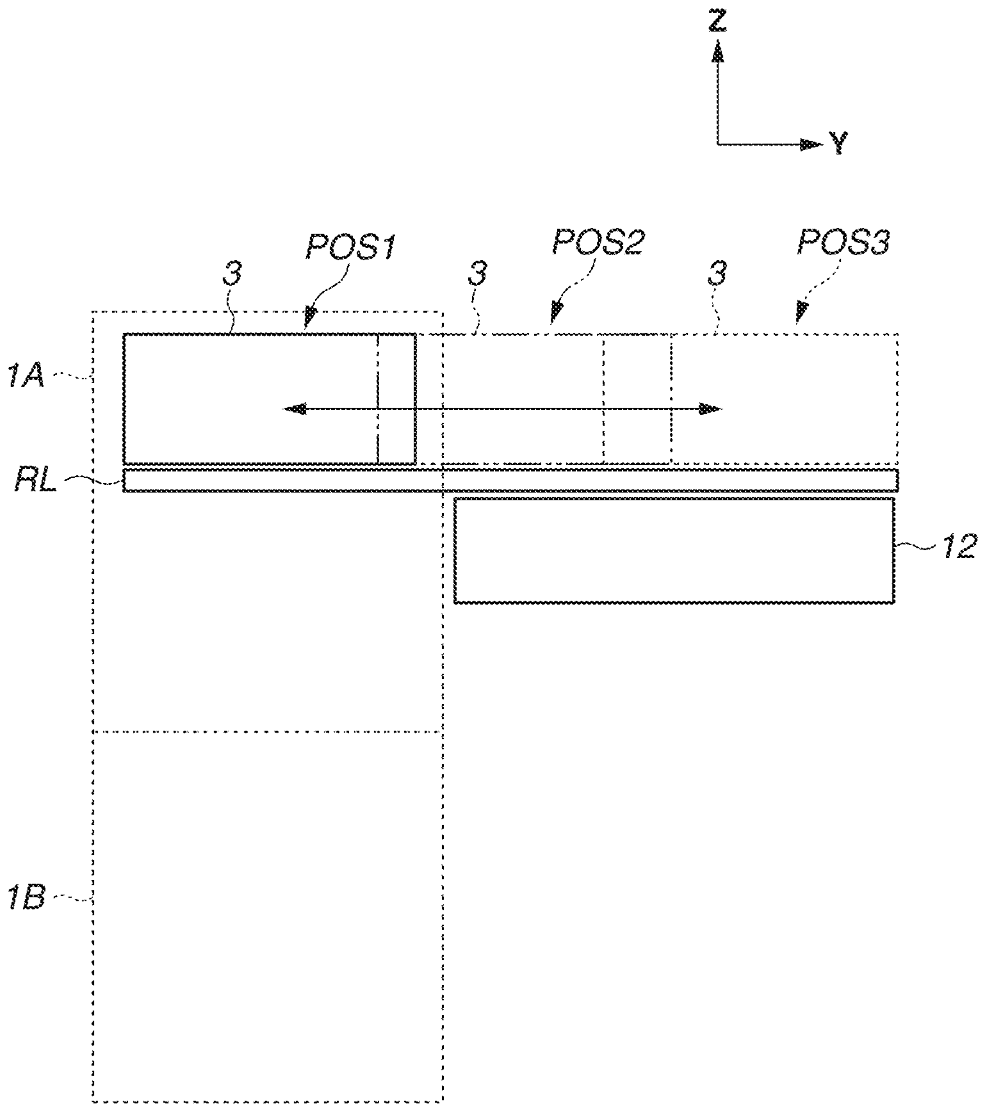
FIG. 3 illustrates a displacement mode of the printing unit illustrated in FIG. 2.

FIG. 3 illustrates a displacement mode of the printing unit 3 and schematically illustrates a right side surface of the printing system 1. A recovery unit 12 is provided at a rear portion of the printing system 1. The recovery unit 12 includes a mechanism for recovering the ejection performance of each printhead 30. Examples of the mechanism include a cap mechanism for capping the ink ejection surface of each printhead 30, a wiper mechanism for wiping the ink ejection surface, and a suction mechanism for performing negative pressure suction of ink in each printhead 30 from the ink ejection surface.

Each guide member RL extends across the recovery unit 12 from a side of the transfer member 2. The printing unit 3 is guided by the guide members RL so as to be displaceable between an ejection position POS1 where the printing unit 3 is indicated by a solid line and a recovery position POS3 where the printing unit 3 is indicated by a broken line. The printing unit 3 is moved by a driving mechanism (not illustrated). The ejection position POS1 is a position where the printing unit 3 ejects ink to the transfer member 2 and the ink ejection surface of each printhead 30 is opposed to the surface of the transfer member 2. The recovery position POS3 is a position where the printing unit 3 has retracted from the ejection position POS1 and the printing unit 3 is located on the recovery unit 12. When the printing unit 3 is located at the recovery position POS3, the recovery unit 12 can execute a recovery process on the printhead 30. In the present exemplary embodiment, the recovery process can be executed also when the printing unit 3 is moving before reaching the recovery position POS3. A preliminary recovery position POS2 is set between the ejection position POS1 and the recovery position POS3. The recovery unit 12 can execute a preliminary recovery process on each printhead 30 at the preliminary recovery position POS2 during a period when the printhead 30 is moving from the ejection position POS1 to the recovery position POS3.

<Transfer Unit>

The transfer unit 4 will now be described with reference to FIG. 1. The transfer unit 4 includes a transfer drum (transfer cylinder) 41 and an impression cylinder 42. These cylinders are rotary members that rotate about a rotation axis in the Y-direction, and include a cylindrical outer peripheral surface. In FIG. 1, arrows indicated in the figures representing the transfer drum 41 and the impression cylinder 42 indicate rotational directions thereof. The transfer drum 41 rotates clockwise and the impression cylinder 42 rotates counterclockwise.

The transfer drum 41 is a support member that supports the transfer member 2 on the outer peripheral surface of the transfer drum 41. The transfer member 2 is continuously or intermittently provided in the circumferential direction on the outer peripheral surface of the transfer drum 41. If the transfer member 2 is continuously provided, the transfer member 2 is formed in an endless belt shape. If the transfer member 2 is intermittently provided, the transfer member 2 is formed into a plurality of segments in a band-like shape with an end, and the segments can be disposed in an arcuate shape at a regular pitch on the outer peripheral surface of the transfer drum 41.

The rotation of the transfer drum 41 allows the transfer member 2 to move cyclically on a circular orbit. Based on a rotational phase of the transfer drum 41, the position of the transfer member 2 can be distinguished in any one of the following areas: an ejection pre-process area R1, an ejection area R2, ejection post-process areas R3 and R4, a transfer area R5, and a transfer post-process area R6. The transfer member 2 passes through these areas cyclically.

The ejection pre-process area R1 is an area where a pre-process is performed on the transfer member 2 before ink is ejected from the printing unit 3 and a process is performed by the peripheral unit 5A. In the present exemplary embodiment, reaction liquid is applied to the ejection pre-process area R1. The ejection area R2 is a formation area where ink is ejected to the transfer member 2 from the printing unit 3 and an ink image is formed. The ejection post-process areas R3 and R4 are process areas in which a process is performed on the ink image after ink is ejected. The ejection post-process area R3 is an area where a process is performed by the peripheral unit 5B. The ejection post-process area R4 is an area where a process is performed by the peripheral unit 5C. The transfer area R5 is an area where the ink image formed on the transfer member 2 is transferred onto the recording medium P by the transfer unit 4. The transfer post-process area R6 is an area where a post-process is performed on the transfer member 2 after the transfer process and a process is performed by the peripheral unit 5D.

In the present exemplary embodiment, the ejection area R2 is an area having a certain interval. The interval of each of the other areas R1 and R3 to R6 is narrower than that of the ejection area R2. If it is compared to a clock dial, the ejection pre-process area R1 is located at a position of approximately 10 o'clock, the ejection area R2 is located in a range of approximately 11 o'clock to 1 o'clock, the ejection post-process area R3 is located at a position of approximately 2 o'clock, and the ejection post-process area R4 is located at a position of approximately 4 o'clock, in the present exemplary embodiment. The transfer area R5 is located at a position of approximately 6 o'clock, and the transfer post-process area R6 is located at a position of located at a position of approximately 8 o'clock.

The transfer member 2 may be composed of a single layer, or may be a laminate including a plurality of layers. If the transfer member 2 is composed of a plurality of layers, the transfer member 2 may include, for example, a surface layer, an elastic layer, and a compressive layer. The surface layer is an outermost layer including an image forming surface on which an ink image is formed. If the compressive layer is provided, the compressive layer absorbs a deformation and disperses local pressure fluctuations, thereby making it possible to maintain transfer properties even in high-speed printing. The elastic layer is a layer formed between the surface layer and the compressive layer.

As a material for the surface layer, various materials such as resin and ceramics can be used as needed. In terms of durability and the like, a material with a high compression modulus can be used. Specifically, examples of the material include acrylic resin, acrylic silicone resin, fluorine-containing resin, and a condensate obtained by condensation of a hydrolytic organic silicon compound. On the surface layer, a surface treatment may be used to improve, for example, reaction liquid wetting properties, and image transfer properties. Examples of the surface treatment include a frame process, a corona process, a plasma process, a polishing process, a roughening process, an active energy line irradiation process, an ozone process, a detergent process, and a silane coupling process. A combination of these processes may also be used. Further, any surface shape can also be formed on the surface layer.

Examples of a material for the compressive layer include acrylonitrile-butadiene rubber, acrylic rubber, chloroprene rubber, urethane rubber, and silicone rubber. During formation of such rubber materials, a predetermined amount of curing agent, accelerator, or the like may be blended and foaming agent, hollow particles, or filler such as salt may be further blended, as needed, to thereby form porous rubber materials. With this configuration, an air bubble portion is compressed with a change in volume with respect to various pressure fluctuations. Whereby, stable transfer properties and durability can be obtained with small variations in directions other than the compression direction. The porous rubber materials include a material having a continuous pore structure in which pores are continuously formed, and a material having an independent pore structure in which pores are formed independently of each other. Either one of these structures may be used, and these structures may also be used in combination.

As a member for the elastic layer, various materials such as resin and ceramics can be used as needed. In terms of processing characteristics and the like, various types of elastomer materials and rubber materials can be used. Specific examples of the materials include fluoro-silicone rubber, phenyl-silicone rubber, fluororubber, chloroprene rubber, urethane rubber, and nitrile rubber. Other examples of the materials include ethylene-propylene rubber, natural rubber, styrene rubber, isoprene rubber, butadiene rubber, ethylene/propylene/butadiene copolymer, and nitrile-butadiene rubber. In particular, silicone rubber, fluoro-silicone rubber, and phenyl-silicone rubber have a small permanent compression set, and thus are advantageous in terms of dimensional stability and durability. Additionally, silicone rubber, fluoro-silicone rubber, and phenyl-silicone rubber have only small modulus variations with temperature, and thus are also advantageous in terms of transfer properties.

Various types of adhesive and double-sided adhesive tape can also be used to fix the surface layer and the elastic layer to each other and to fix the elastic layer and the compressive layer to each other. The transfer member 2 may include a reinforcing layer with a high compression modulus so as to prevent lateral extension and maintain stiffness when the transfer member 2 is mounted on the transfer drum 41. Woven cloth may also be used as the reinforcing layer. The transfer member 2 can be prepared using any combination of the layers made of the materials described above.

The outer peripheral surface of the impression cylinder 42 is brought into pressure contact with the transfer member 2. The outer peripheral surface of the impression cylinder 42 is provided with at least one grip mechanism for holding a leading edge of the recording medium P. A plurality of grip mechanisms may be provided in the circumferential direction of the impression cylinder 42 such that the grip mechanisms are spaced apart from each other. When the recording medium P passes through a nip portion between the impression cylinder 42 and the transfer member 2 while the recording medium P is conveyed in close contact with the outer peripheral surface of the impression cylinder 42, the ink image formed on the transfer member 2 is transferred onto the recording medium P.

A driving source, such as a motor, for driving the transfer drum 41 and the impression cylinder 42 is used in common to the transfer drum 41 and the impression cylinder 42. A driving force of the driving source can be distributed by a transmission mechanism, such as a gear mechanism.

<Peripheral Units>

The peripheral units 5A to 5D are provided in the vicinity of the transfer drum 41. In the present exemplary embodiment, the peripheral units 5A, 5B, 5C and 5D correspond to an application unit, an absorption unit, a heating unit, and a cleaning unit, respectively.

The application unit 5A is a mechanism for applying reaction liquid onto the transfer member 2 before ink is ejected from the printing unit 3. The reaction liquid is liquid containing components for increasing the viscosity of ink. In this case, the increase in the viscosity of ink indicates a chemical reaction or physical adsorption caused when a coloring material, resin, or the like constituting ink contacts components for increasing the viscosity of ink, so that an increase in the viscosity of ink is observed. The increase in the viscosity of ink is caused not only when an increase in the viscosity of entire ink is observed, but also when some of the components constituting ink, such as a coloring material or resin, aggregate, which causes a local increase in viscosity.

Components for increasing the viscosity of ink are not limited, and metal ions, high-polymer coagulant, and the like can be used. Any material that causes pH change in ink and causes the coloring material contained in ink to aggregate can be used, and organic acid can also be used. Examples of the mechanism for applying the reaction liquid include a roller, a printhead, a die coating apparatus (die coater), and a blade coating apparatus (blade coater). When the reaction liquid is applied to the transfer member 2 before ink is ejected to the transfer member 2, the ink that has reached the transfer member 2 can be fixed immediately. Thus, bleeding of adjacent inks can be prevented.

The absorption unit 5B is a mechanism for absorbing liquid components from the ink image formed on the transfer member 2 before the transfer process. The liquid components of the ink image are decreased to thereby prevent, for example, bleeding of an image to be printed on the recording medium P. From a different perspective, a decrease in liquid components can also be expressed as concentration of ink constituting the ink image formed on the transfer member 2. The concentration of ink indicates an increase in the ratio of a solid content, such as a coloring material or resin contained in ink, to liquid components due to a decrease in liquid components included in ink.

The absorption unit 5B includes, for example, a liquid absorbing member that is brought into contact with the ink image to reduce the amount of liquid components of the ink image. The liquid absorbing member may be formed on the outer peripheral surface of the roller, or the liquid absorbing member may be formed in an endless sheet shape and may be configured to run cyclically. In terms of protection of the ink image, the liquid absorbing member may be moved in synchronization with the transfer member 2 at a movement speed that is equal to the circumferential speed of the transfer member 2.

The liquid absorbing member may include a porous body that is brought into contact with the ink image. To prevent the ink solid content from adhering to the liquid absorbing member, the pore diameter size of the porous body on the surface that contacts the ink image may be 10 μm or less. The term "pore diameter size" used herein refers to an average diameter. The pore diameter size can be measured by a known method such as a mercury penetration method, a nitrogen adsorption method, or scanning electron microscope (SEM) image observation. The liquid components are not limited, as long as the liquid components do not have a certain shape, have fluidity, and have a substantially constant volume. Examples of the liquid components include water and organic solvent included in ink or reaction liquid.

The heating unit 5C is a mechanism for heating the ink image formed on the transfer member 2 before the transfer process. The ink image is heated to melt resin included in the image, which leads to an improvement in transfer properties onto the recording medium P. The heating temperature can be set to a minimum film forming temperature (MFT) of a resin or higher. The MFT can be measured by apparatuses conforming to a widely known method such as Japanese Industrial Standards (JIS) K 6828-2:2003 or International Organization for Standardization (ISO) 2115:1996. In terms of transfer properties and image fastness properties, the heating temperature may be higher than the MFT by 10° C. or more, or may be higher than the MFT by 20° C. or more. As the heating unit 5C, known heating devices such as various lamps (i.e., an infrared lamp), and a hot-air fan can be used. In terms of heating efficiency, an infrared heater can be used.

The cleaning unit 5D is a mechanism for cleaning the surface of the transfer member 2 after the transfer process. The cleaning unit 5D removes, for example, residual ink on the transfer member 2, and contaminants on the transfer member 2. The cleaning unit 5D can use, as needed, a known method such as a method for bringing a porous member into contact with the transfer member 2, a method for rubbing the surface of the transfer member 2 with a brush, or a method for scraping off the surface of the transfer member 2 with a blade. As a cleaning member used for cleaning, a known shape, such as a roller shape or a web shape, can be used.

As described above, the present exemplary embodiment includes the application unit 5A, the absorption unit 5B, the heating unit 5C, and the cleaning unit 5D as the peripheral units. Alternatively, a cooling function for the transfer member 2 may be applied to some of the peripheral units, or a cooling unit may be additionally provided. In the present exemplary embodiment, the temperature of the transfer member 2 can rise due to the heat of the heating unit 5C. If the temperature of the ink image exceeds the boiling temperature of water, which is the prime solvent of ink, after ink is ejected to the transfer member 2 from the printing unit 3, the liquid component absorption performance of the absorption unit 5B can deteriorate. The transfer member 2 is cooled so as to maintain the ejected ink at a temperature lower than the boiling temperature of water, thereby making it possible to maintain the liquid component absorption performance.

The cooling unit may be a blower mechanism for blowing air to the transfer member 2, or a mechanism for bringing a member (e.g., a roller) into contact with the transfer member 2 to cool this member by air cooling or water cooling. More alternatively, the cooling unit may be a mechanism for cooling the cleaning member of the cleaning unit 5D. A timing for cooling may be set in a period between after the transfer process and before the reaction liquid application.

<Supply Unit>

The supply unit 6 is a mechanism for supplying ink to each printhead 3 of the printing unit 3. The supply unit 6 may be provided at a rear portion of the printing system 1. The supply unit 6 includes accumulation portions TK for accumulating ink for each type of ink. Each accumulation portion TK may be composed of a main tank and a sub-tank. Each accumulation portion TK and each printhead 30 communicate with each other through a channel 6*a*, and ink is supplied from the accumulation portion TK to the printhead 30. The channel 6*a* may be a channel for circulating ink between each accumulation portion TK and each printhead 30, and the supply unit 6 may include a pump or the like for circulating ink. In the middle of the channel 6*a* or in each accumulation portion TK, a deaeration mechanism for eliminating air bubbles in ink may be provided. In the middle of the channel 6*a* or in each accumulation portion TK, a valve for adjusting the ink liquid pressure and the atmospheric pressure may be provided. The height of each accumulation portion TK and each printhead 30 in the Z-direction may be designed such that the ink liquid level in each accumulation portion TK is lower than the ink ejection surface of each printhead 30.

<Conveyance Apparatus>

The conveyance apparatus 1B is an apparatus that feeds the recording medium P to the transfer unit 4 and discharges the printed matter P' onto which the ink image is transferred from the transfer unit 4. The conveyance apparatus 1B includes a feed unit 7, a plurality of conveyance cylinders 8 and 8*a*, two sprockets 8*b*, a chain 8*c*, and a collection unit 8*d*. In FIG. 1, arrows within the figures respectively representing the components of the conveyance apparatus 1B indicate rotational directions of the components, and arrows on the outside of the components indicate a conveyance path for the recording medium P or the printed matter P'. The recording medium P is conveyed from the feed unit 7 to the transfer unit 4, and the printed matter P' is conveyed from the transfer unit 4 to the collection unit 8*d*. A side where the feed unit 7 is located is also referred to as an upstream side in the conveyance direction, and a side where the collection unit 8*d* is located is also referred to as a downstream side in the conveyance direction.

The feed unit 7 includes a stacking portion on which a plurality of recording media P is stacked, and also includes a feed mechanism for feeding the recording media P one by one from the stacking portion to the conveyance cylinder 8 located on the uppermost stream side. Each of the conveyance cylinders 8 and 8*a* is a rotary member that rotates about the rotation axis in the Y-direction, and includes a cylindrical outer peripheral surface. On the outer peripheral surface of each of the conveyance cylinders 8 and 8*a*, at least one grip mechanism for holding a leading edge of each recording medium P (or printed matter P') is provided. A grip operation and a release operation for each grip mechanism are controlled such that each recording medium P can be delivered between the adjacent conveyance cylinders.

The two conveyance cylinders 8*a* are conveyance cylinders for reversing each recording medium P. In the case of two-sided printing on the recording medium P, the recording medium P is delivered to the conveyance cylinders 8*a*, without delivering the recording medium P to the conveyance cylinders 8 adjacent to the conveyance cylinders 8*a* on the downstream side, from the impression cylinder 42 after the ink image is transferred onto the surface of the recording medium P. The surface of the recording medium P is reversed via the two conveyance cylinders 8*a*, and is delivered to the impression cylinder 42 again via the conveyance cylinders 8 located on the upstream side of the impression cylinder 42. The back surface of the recording medium P thereby faces the transfer drum 41 and the ink image is transferred onto the back surface of the recording medium P.

The chain 8*c* is wound around the two sprockets 8*b*. One of the two sprockets 8*b* is a driving sprocket, and the other of the sprockets 8*b* is a driven sprocket. The rotation of the driving sprocket allows the chain 8*c* to run cyclically. The chain 8*c* is provided with a plurality of grip mechanisms spaced apart from each other in the longitudinal direction of the chain 8*c*. Each of the grip mechanisms grips an end of the printed matter P'. The printed matter P' is delivered to the grip mechanisms of the chain 8*c* from the conveyance cylinder 8 located at the downstream end, and the printed matter P' griped by the grip mechanisms is conveyed to the collection unit 8*d* along with the running of the chain 8*c* and then the gripped state is released. The printed matter P' is thereby stacked in the collection unit 8*d*.

<Post-Process Units>

The conveyance apparatus 1B is provided with post-process units 10A and 10B. The post-process units 10A and 10B are mechanisms disposed on the downstream side of the transfer unit 4 perform a post process on the printed matter P'. The post-process unit 10A performs a process on the front surface of the printed matter P', and the post-process unit 10B performs a process on the back surface of the printed matter P'. Examples of process contents include coating on the image printing surface of the printed matter P' to achieve, for example, image protection, and polishing. Examples of coating contents include coating of liquid, sheet welding, and laminating.

<Inspection Units>

The conveyance apparatus 1B is provided with inspection units 9A and 9B. The inspection units 9A and 9B disposed on the downstream side of the transfer unit 4 are mechanisms that inspect the printed matter P'.

In the present exemplary embodiment, the inspection unit 9A is an image capturing apparatus that captures an image printed on the printed matter P'. Examples of the inspection unit 9A include an image sensor, such as a charge-coupled device (CCD) sensor and a complementary metal-oxide semiconductor (CMOS) sensor. The inspection unit 9A is a unit that performs an analysis for a dynamic print position adjustment to capture a print image during a printing operation that is continuously performed. The inspection unit 9A checks a variation with time of the color or the like of the print image based on the image captured by the inspection unit 9A, thereby making it possible to determine whether image data or print data can be corrected. In the present exemplary embodiment, the inspection unit 9A is disposed such that the print image on the printed matter P' conveyed by the chain 8*c* can be partially captured. The inspection unit 9A may perform an inspection on all print images, or may perform the inspection every predetermined number of pages.

In the present exemplary embodiment, the inspection unit 9B is also an image capturing apparatus that captures an image printed on the printed matter P'. Examples of the inspection unit 9B include an image sensor such as a CCD sensor or a CMOS sensor. The inspection unit 9B performs a static print position adjustment and captures a print image in a test printing operation. The inspection unit 9B can capture the entire print image, and can perform basic settings for various correction processes on print data based on the image captured by the inspection unit 9B. In the present exemplary embodiment, the inspection unit 9B is disposed at a position where the print image on the printed matter P' conveyed by the chain 8*c* is captured. In a case where the print image is captured by the inspection unit 9B, the running of the chain 8*c* is stopped temporarily to capture the entire image. The inspection unit 9B may be a scanner for scanning the surface of the printed matter P'.

<Control Units>

Figure 4:
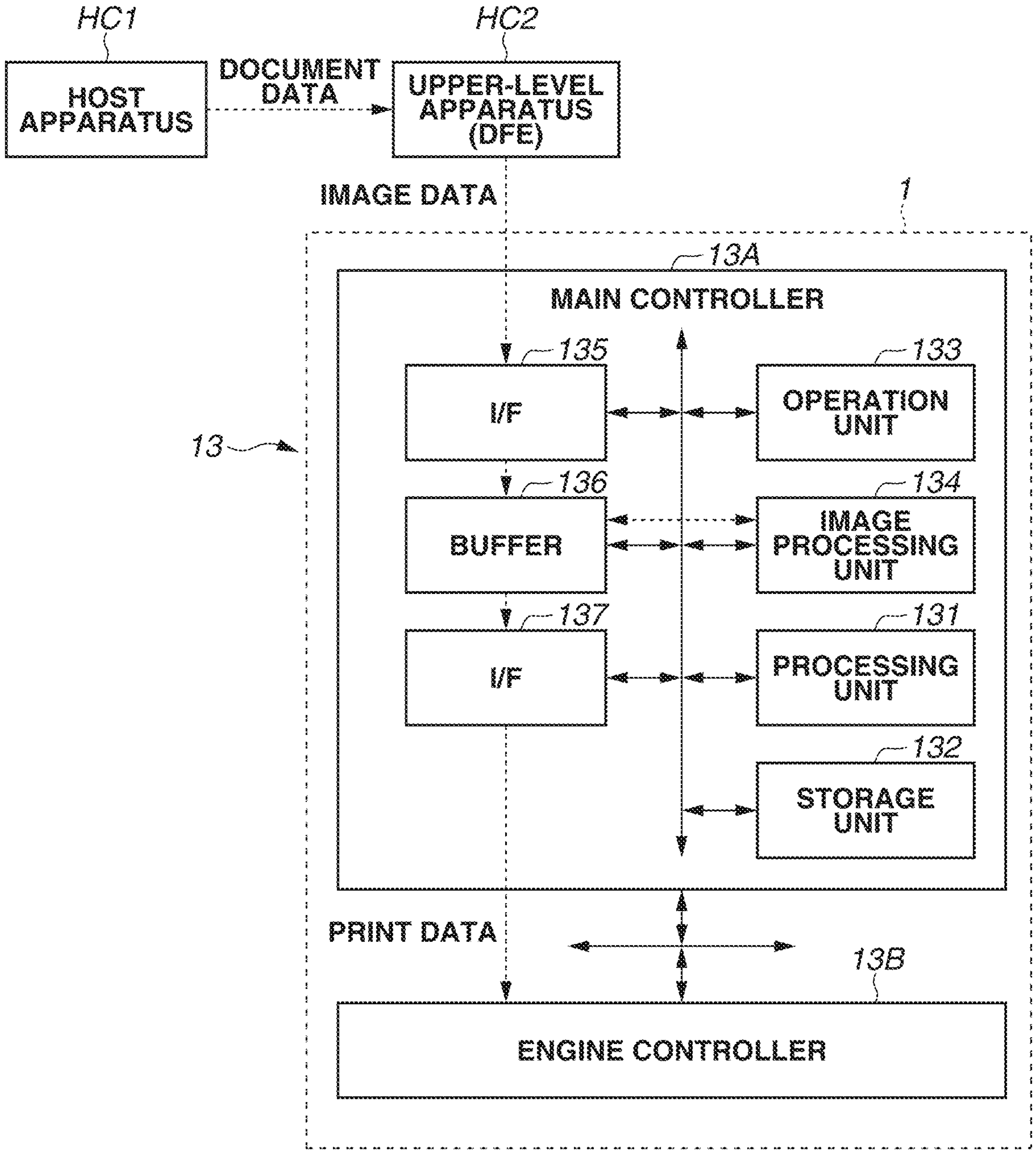
FIG. 4 is a block diagram illustrating a control system for the printing system illustrated in FIG. 1.
Figure 5:
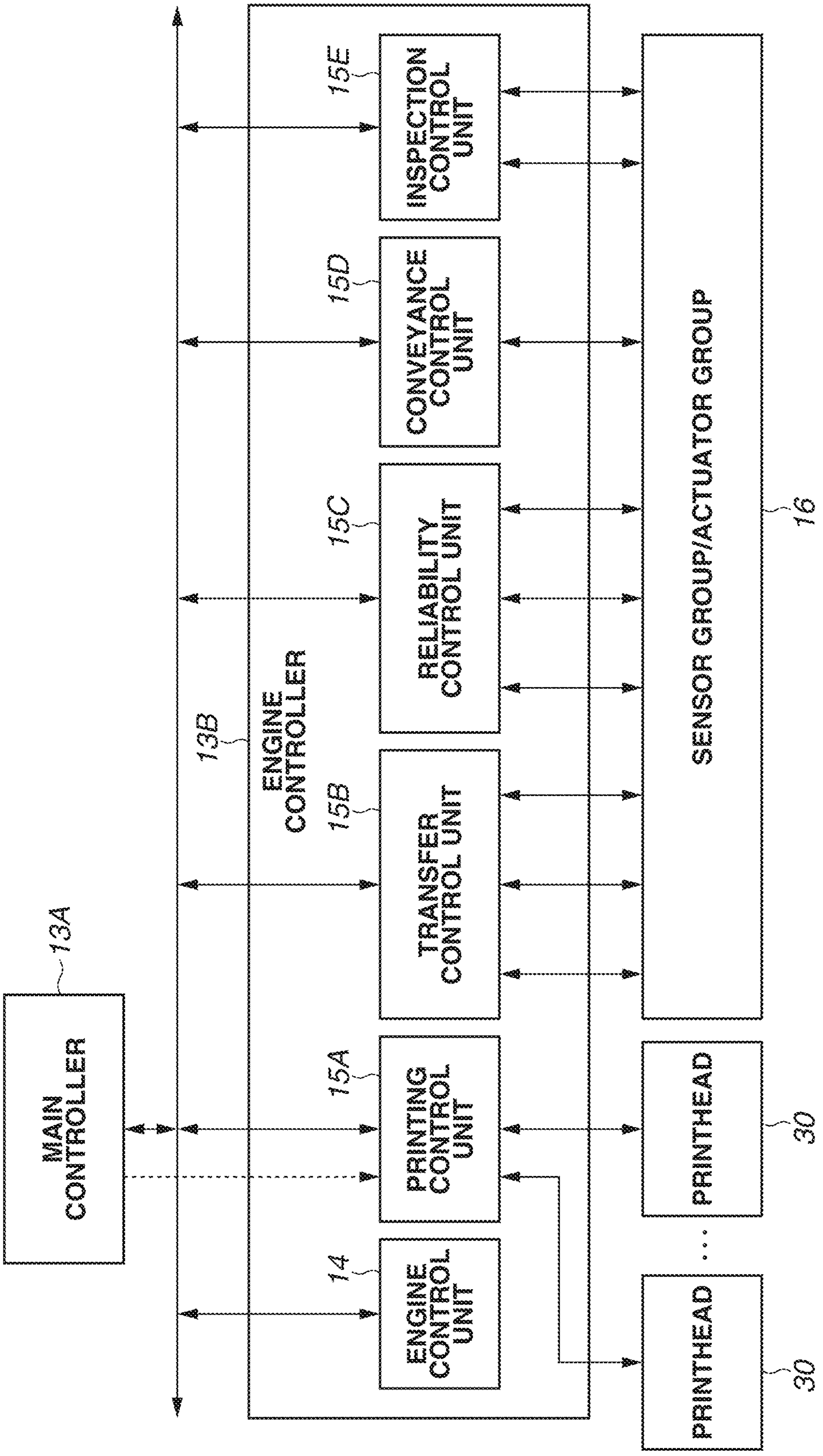
FIG. 5 is a block diagram illustrating the control system for the printing system illustrated in FIG. 1.

Control units for the printing system 1 will now be described. FIGS. 4 and 5 are block diagrams each illustrating a control unit 13 for the printing system 1. The control unit 13 is communicably connected to an upper-level apparatus (Digital Front End (DFE)) HC2. The upper-level apparatus HC2 is communicably connected to a host apparatus HC1.

The host apparatus HC1 generates document data, which is an original of the print image, or stores the document data. Document data used herein is generated in the format of, for example, an electronic file, such as a text file or an image file. This document data is transmitted to the upper-level apparatus HC2, and the upper-level apparatus HC2 converts the received document data into a data format (e.g., red (R), green (G), and blue (B) data representing an image in RGB) that can be used by the control unit 13. The converted data is transmitted as image data from the upper-level apparatus HC2 to the control unit 13, and the control unit 13 starts a printing operation based on the received image data.

In the present exemplary embodiment, the control unit 13 is broadly divided into a main controller 13A and an engine controller 13B. The main controller 13A includes a processing unit 131, a storage unit 132, an operation unit 133, an image processing unit 134, a communication interface (I/F) 135, a buffer 136, and a communication I/F 137.

The processing unit 131 is a processor, such as a central processing unit (CPU). The processing unit 131 executes programs stored in the storage unit 132, thereby controlling the overall operation of the main controller 13A. The storage unit 132 is a storage device, such as a random access memory (RAM), a read-only memory (ROM), a hard disk, or a solid-state drive (SSD). The storage unit 132 stores programs to be executed by the processing unit 131 and data, and provides a work area for the processing unit 131. The operation unit 133 is, for example, an input device such as a touch panel, a keyboard, or a mouse, and receives an instruction from a user.

The image processing unit 134 is, for example, an electronic circuit including an image processing processor. The buffer 136 is, for example, a RAM, a hard disk, or an SSD. The communication I/F 135 communicates with the upper-level apparatus HC2, and the communication I/F 137 communicates with the engine controller 13B. A dashed arrow illustrated in FIG. 4 indicates an example of an image data processing flow. Image data received from the upper-level apparatus HC2 via the communication I/F 135 is accumulated in the buffer 136. The image processing unit 134 reads out image data from the buffer 136 and performs predetermined image processing on the read image data, and stores the image data in the buffer 136 again. The image data that is subjected to the image processing and stored in the buffer 136 is transmitted from the communication I/F 137 to the engine controller 13B as print data to be used for a print engine.

As illustrated in FIG. 5, the engine controller 13B includes an engine control unit 14 and control units 15A to 15E. The engine controller 13B acquires detection results from a sensor group/actuator group 16 included in the printing system 1 and performs a driving control. These control units include a processor, such as a CPU, a storage device, such as a RAM or a ROM, and an interface with an external device. Grouping of the control units is merely an example. For example, a part of the control operation may be executed by a plurality of control units that are further segmented, or the plurality of control units may alternatively be integrated so that the control contents can be executed by a single control unit.

The engine control unit 14 controls the entire operation of the engine controller 13B. The printing control unit 15A converts print data received from the main controller 13A into a data format, such as cluster data, which is suitable for driving each printhead 30. The printing control unit 15A controls the ejection from each printhead 30.

The transfer control unit 15B controls each of the application unit 5A, the absorption unit 5B, the heating unit 5C, and the cleaning unit 5D.

The reliability control unit 15C controls each of the supply unit 6, the recovery unit 12, and the driving mechanism for moving the printing unit 3 between the ejection position POS1 and the recovery position POS3.

The conveyance control unit 15D controls driving of the transfer unit 4, and controls the conveyance apparatus 1B. The inspection control unit 15E controls each of the inspection unit 9A and the inspection unit 9B.

The sensor group in the sensor group/actuator group 16 includes a sensor for detecting the position and speed of a movable portion, a sensor for detecting a temperature, and an image sensor. The actuator group in the sensor group/actuator group 16 includes a motor, an electromagnetic solenoid, and an electromagnetic valve.

<Operation Example>

Figure 6:
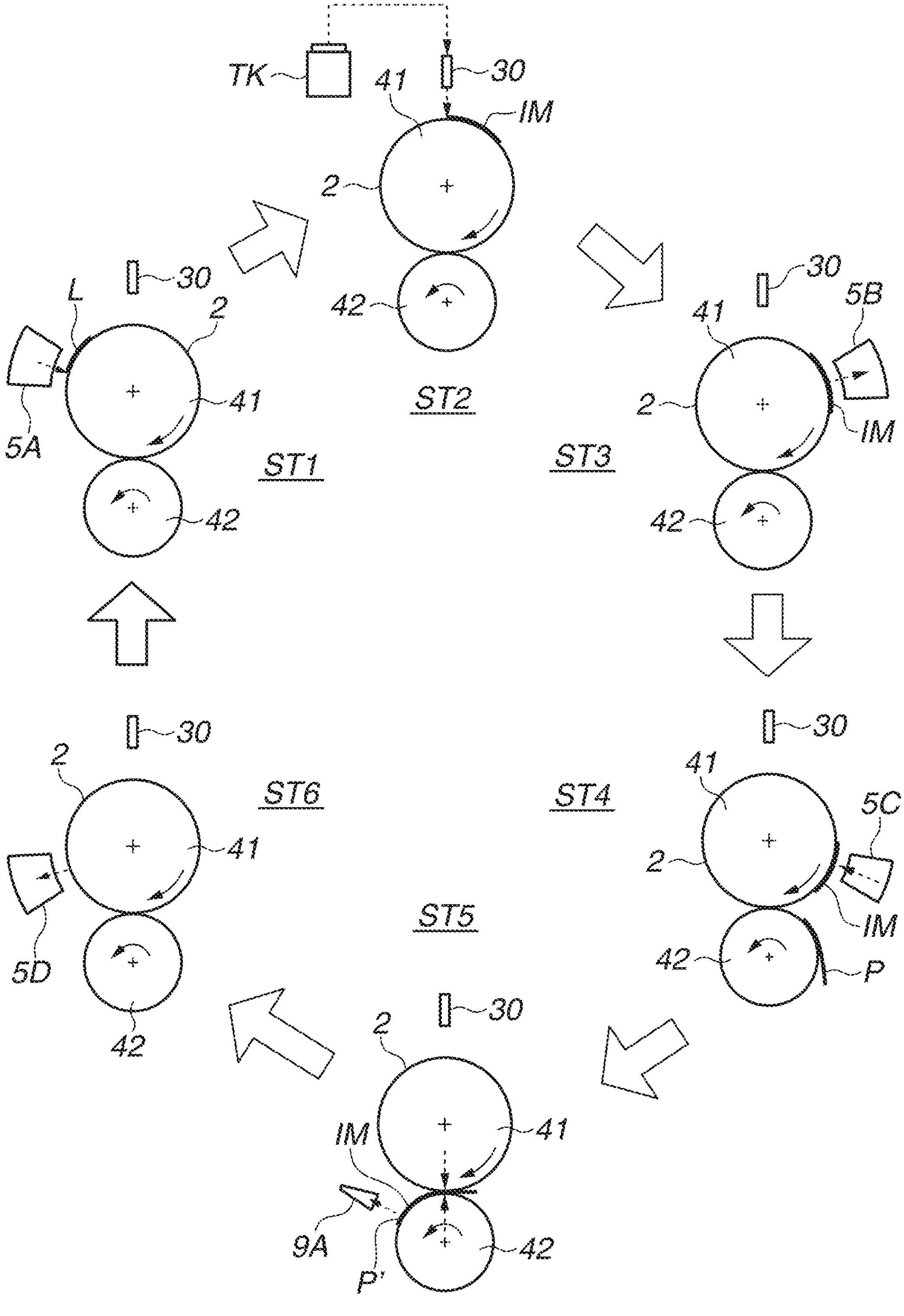
FIG. 6 schematically illustrates an operation example of the printing system illustrated in FIG. 1.

FIG. 6 schematically illustrates an example of the printing operation. The following processes are carried out cyclically while the transfer drum 41 and the impression cylinder 42 are rotated. As indicated in a state ST1, reaction liquid L is first applied onto the transfer member 2 from the application unit 5A. A portion where the reaction liquid L is applied on the transfer member 2 is moved along with the rotation of the transfer drum 41. When the portion where the reaction liquid L is applied reaches a position below the printhead 30, ink is ejected from the printhead 30 to the transfer member 2 as indicated in a state ST2. Thus, an ink image IM is formed. In this case, the ejected ink is mixed with the reaction liquid L on the transfer member 2, thereby promoting the aggregation of the coloring material. The ejected ink is supplied from the accumulation portion TK of the supply unit 6 to the printhead 30.

The ink image IM formed on the transfer member 2 is moved along with the rotation of the transfer member 2. When the ink image IM reaches the absorption unit 5B, liquid components are absorbed from the ink image IM by the absorption unit 5B, as indicated in a state ST3. When the ink image IM reaches the heating unit 5C, the ink image IM is heated by the heating unit 5C as indicated in a state ST4, so that resin in the ink image IM is melted and the ink image IM is formed as a film. In synchronization with the formation of the ink image IM, the recording medium P is conveyed by the conveyance apparatus 1B.

As indicated by a state ST5, the ink image IM and the recording medium P reach the nip portion between the transfer member 2 and the impression cylinder 42, and the ink image IM is transferred onto the recording medium P, thereby producing the printed matter P'. When the printed matter P' passes through the nip portion, the image printed on the printed matter P' is captured and the print image is inspected by the inspection unit 9A. The printed matter P' is conveyed to the collection unit 8*d* by the conveyance apparatus 1B.

When a portion where the ink image IM is formed on the transfer member 2 reaches the cleaning unit 5D, the surface of the portion is cleaned by the cleaning unit 5D as indicated by a state ST6. The transfer member 2 is rotated once after the cleaning process, and the ink image transfer process is repeatedly performed in the same procedure. To facilitate understanding of the present exemplary embodiment, the exemplary embodiment described above illustrates an example where the process of transferring the ink image IM onto a single recording medium P is performed once during a period when the transfer member 2 is rotated once. However, the process of transferring the ink image IM onto a plurality of recording media P can be continuously performed during the period when the transfer member 2 is rotated once.

Figure 7:
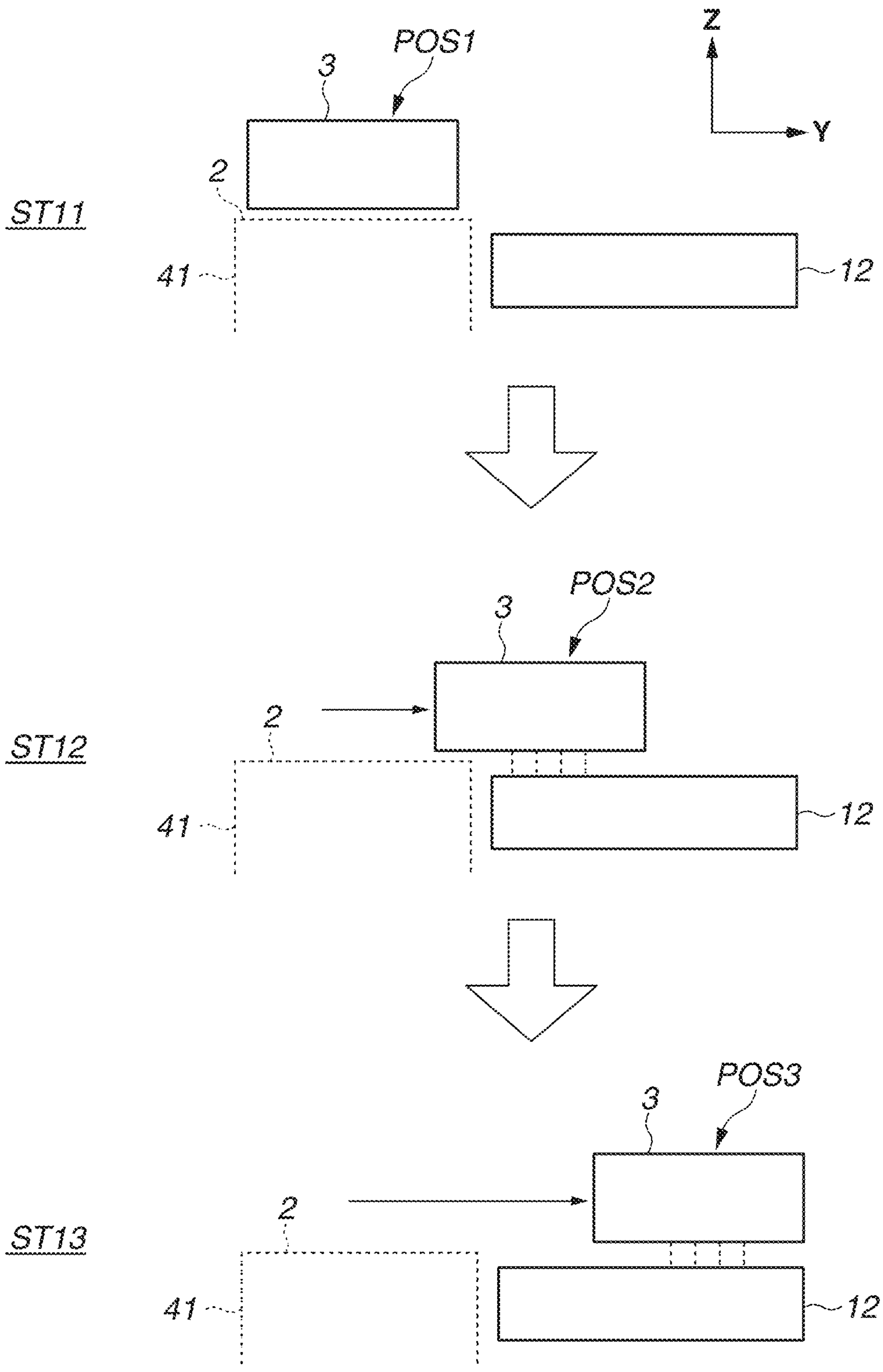
FIG. 7 schematically illustrates an operation example of the printing system illustrated in FIG. 1.

After the printing operation is continuously performed, maintenance for each printhead 30 may be required. FIG. 7 illustrates an operation example for maintenance of each printhead 30. A state ST11 indicates a state where the printing unit 3 is located at the ejection position POS1. A state ST12 indicates a state where the printing unit 3 passes through the preliminary recovery position POS2. During the pass, the process of recovering the ejection performance of each printhead 30 of the printing unit 3 is executed by the recovery unit 12. Thereafter, the process of recovering the ejection performance of each printhead 30 is executed by the recovery unit 12 in a state where the printing unit 3 is located at the recovery position POS3 as indicated by a state ST13.

<Operation Example>

An example of the normal printing operation is described above. Next, the dynamic print position adjustment to be executed by the inspection unit 9A according to the present exemplary embodiment will be described. In the present exemplary embodiment, type information about the type of the recording medium P used in the previous printing operation is stored in the storage unit 132 illustrated in FIG. 4. In the below-described determination process performed in step S300, it is determined whether an update is required based on the type information. As the type information, not only information indicating the type of the recording media P that can be treated in the printing apparatus 1A, but also information registered as a type of a recording medium prepared by the user may be stored in advance.

Figure 8:
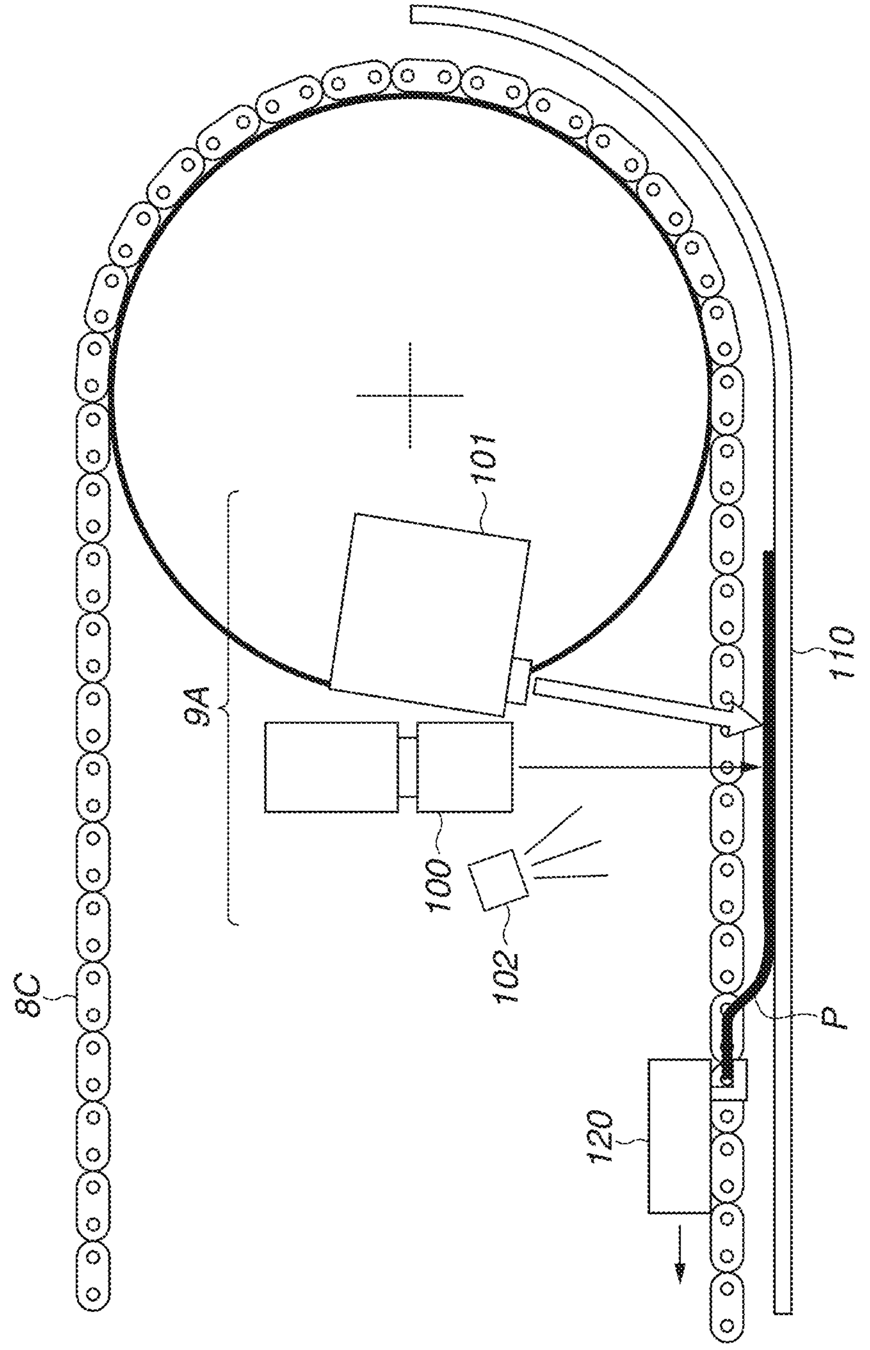
FIG. 8 illustrates details of an inspection unit in the printing system illustrated in FIG. 1.

FIG. 8 illustrates details of the inspection unit 9A and a peripheral portion. The inspection unit 9A includes an image capturing apparatus 100, a blower 101, and a light source 102. Light emitted from the light source 102 is reflected by a print position adjustment pattern printed on the recording medium P, and the reflected light is read by the image capturing apparatus 100, and thereby read data on the print position adjustment pattern is acquired by a data acquisition unit. The light emission intensity of the light source 102 according to the present exemplary embodiment is variable. Conditions suitable for the print position adjustment pattern reading operation can be calculated based on a white reference of the image capturing apparatus 100.

To obtain appropriate conditions for the reading operation, the quantity of light for reading the pattern is adjusted in the present exemplary embodiment. By controlling the quantity of light received by the image capturing apparatus 100, the reading result can be rapidly reflected in the subsequent printing operation without correcting the read image data. Examples of the method for adjusting the light quantity may include an adjustment of light irradiated from the light source 102, and an adjustment of the reading operation of the image capturing apparatus 100. The engine controller 13B performs as an adjustment unit to adjust the reading operation. For example, in the present exemplary embodiment, at least one of changing a light emission time of the light source 102 during image capturing, changing a light emission intensity of the light source 102 during image capturing, and changing an exposure time of the image capturing apparatus 100 is executed. If the reading result can be reflected more rapidly than when the light quantity adjustment is not executed, the correction process may be performed on the read data. For example, if the light quantity adjustment enables an increase in the reading accuracy and a reduction in the amount of correction and the time for correction, both the light quantity adjustment and the correction process may be executed.

The recording medium P is conveyed by a grip mechanism 120 disposed on the chain 8*c*. When the image printed on the recording medium P is captured by the image capturing apparatus 100, air blown from the blower 101 presses the recording medium P against a regulating member 110 disposed at a position opposed to the blower 101. In this case, the amount of air blown from the blower 101 may be prescribed depending on the properties of the recording medium P. For example, a higher air flow than that for a recording medium with lower rigidity may be set for a recording medium with higher rigidity.

The above-described operations enable the surface of the recording medium P to be located at a position corresponding to a focal length from the image capturing apparatus 100, while the distance between the image capturing apparatus 100 and the printed matter P' during image capturing is maintained at a constant distance. An image suitable for analysis can thereby be captured.

Figure 9:
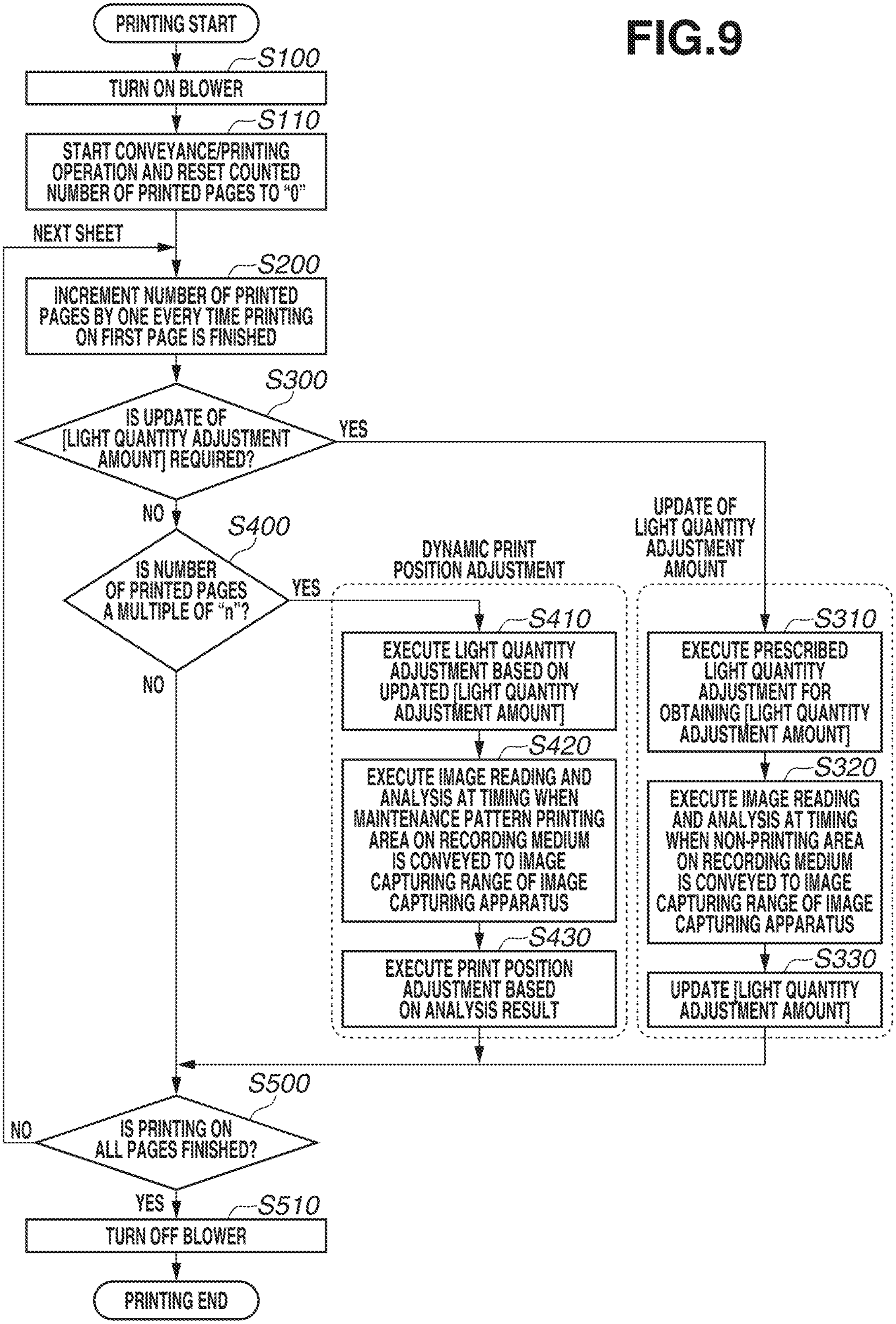
FIG. 9 is a flowchart illustrating a dynamic print position adjustment to be executed by the printing system illustrated in FIG. 1.
Figure 11:
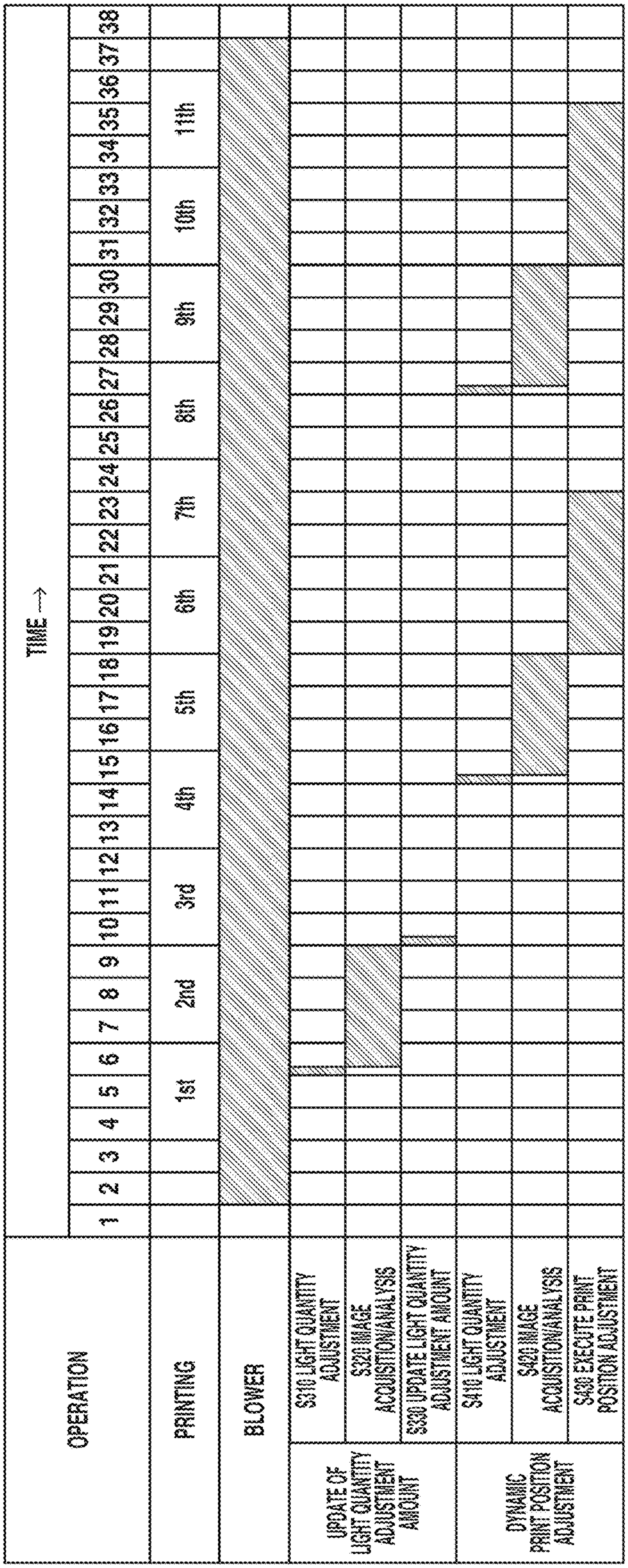
FIG. 11 is a timing chart of the dynamic print position adjustment to be executed by the printing system illustrated in FIG. 1.

FIG. 9 is a flowchart illustrating a dynamic print position adjustment flow during the printing operation according to the present exemplary embodiment. FIG. 11 is a timing chart illustrating an operation example when the number of printed pages indicated by a print job is 11 and the dynamic print position adjustment is executed at a timing when the number of printed pages is a multiple of four.

When a print job is received, the processing flow starts. In the present exemplary embodiment, assume that a single print job includes an instruction to print an image on a plurality of recording media of the same type. In step S100, the operation of the blower 101 is turned on to start air blowing. In step S110, the recording medium P is fed and an image printing operation is started. At the same time, the counted number of printed pages is reset to "0". In step S200, the number of printed pages is counted up every time printing on one recording medium P is finished. In step S300, it is determined whether to update a light quantity adjustment amount. In step S400, it is determined whether to execute the dynamic print position adjustment. The determination processes from step S200 to step S400 are repeated until step S500 is finished. After printing is finished, in step S510, the operation of the blower 101 is turned off.

In step S300, it is determined whether update of the light quantity adjustment amount is required. As determination criteria, for example, it is determined that update is not required in a case where the type of the recording medium P on which the image is printed in the previous print job is the same as the type of the recording medium P used in the previous printing, and it is determined that update of the light quantity adjustment amount is required in a case where the type of the recording medium P on which the image is printed in the previous print job is different from the type of the recording medium P used in the previous printing. In this case, characteristic information about the recording medium P stored in the storage unit 132 is acquired, and when the type of the recording medium P indicated by the characteristic information is the same as the type of the recording medium P on which the image is to be printed, it is determined that there is no need to update the light quantity adjustment amount, and the light quantity adjustment is not executed. In contrast, when the type of the recording medium P indicated by the characteristic information is different from the type of the recording medium P on which the image is to be printed, it is determined that there is a need to adjust the light quantity, and the characteristic information stored in the storage unit 132 is updated. The characteristic information about the recording medium P may be type information indicating the type of the recording medium P, color information indicating a ground color on the recording medium P, or information indicating reflection characteristics of irradiated light.

Figure 10:
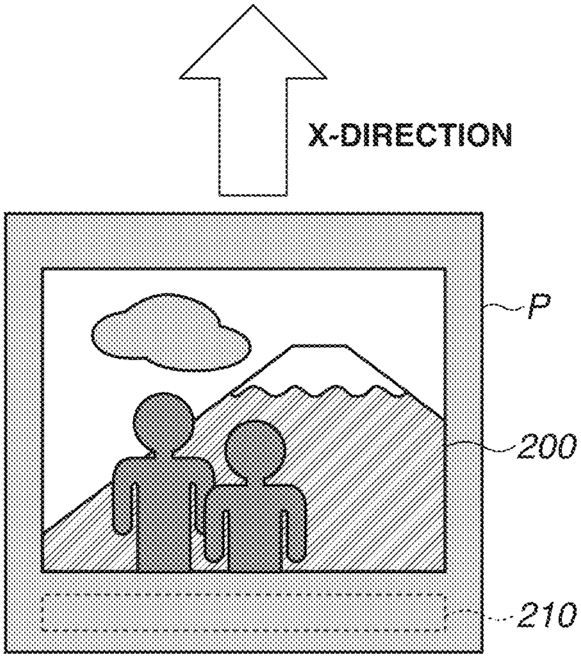
FIG. 10 illustrates a printing area on a recording medium printed by the printing system illustrated in FIG. 1.

If it is determined that update of the light quantity adjustment amount is required (YES in step S300), the processing proceeds to step S310. In step S310, the light quantity adjustment for acquiring a prescribed light quantity adjustment amount is executed. In step S320, the image is read at a timing when a non-printing area, i.e., an area where no ink is applied, on the recording medium P is conveyed to an image capturing range of the image capturing apparatus 100, and the image is analyzed. A single recording medium for acquiring the ground color (so-called blank sheet color) of the recording medium may be prepared and the recording medium may be conveyed to the image capturing area in a state where no image is printed on the recording medium. As illustrated in FIG. 10, a maintenance pattern printing area 210 for a maintenance pattern may be provided outside a printing area 200, and this area may be used as the non-printing area when the maintenance pattern is not printed on the maintenance pattern printing area 210. In step S330, the light quantity adjustment amount obtained by the analysis is set as a new light quantity adjustment amount.

In step S400, if it is determined that the number of printed pages is a multiple of "n" (YES in step S400), the processing proceeds to step S410. In step S410, the dynamic print position adjustment is executed. In this case, "n" is a predetermined natural number equal to or greater than 2. In step S410, the light quantity adjustment is executed based on the light quantity adjustment amount updated in step S330. In step S420, the image is acquired at a timing when the maintenance pattern printing area 210 on the recording medium P is conveyed to the image capturing range of the image capturing apparatus 100, and the acquired image is analyzed. In step S430, the print position adjustment is executed based on the obtained analysis result. In the print position adjustment, for example, a method for driving each printhead 30 to perform a fine adjustment, or a method for changing a timing when ink droplets are ejected from each printhead 30 may be employed. For example, assuming that the print position adjustment pattern is printed when the number of printed pages is a multiple of "n", the print position adjustment pattern is printed on the first to m (a natural number that satisfies m<n)-th pages. For example, when n=4, no image is printed on the maintenance pattern printing area 210 of the first to third pages. The ground color on the recording medium P is therefore read at a time when any one of the first to third pages is fed. Further, the print position adjustment pattern printed on the maintenance pattern printing area 210 on the fourth page is read with the adjusted light quantity based on the reading result. The print position adjustment pattern can thereby be read with the light quantity suitable for the recording medium P of the type used in the print job, and the need for correcting the read data is eliminated, which leads to a reduction in time for reflecting the reading result.

By using the control operation described above, the light quantity adjustment amount is changed depending on the type of the recording medium P, and thus the image capturing apparatus 100 can perform image capturing under suitable conditions and can appropriately adjust the print position, even when various types of recording media having different surface properties or colors are used.

For example, in a case where a pattern is printed with yellow ink on a yellowish recording medium, it is difficult to distinguish the ground color on the recording medium from the color of the pattern in the read data, if the intensity of light irradiated from the light source 102 is extremely high. In contrast, the ratio of noise components to the read data increases, which leads to a deterioration in accuracy, if the intensity of light irradiated from the light source 102 is extremely low. Further, it is difficult to set an appropriate light quantity in advance when a recording medium prepared by the user is used. To deal with these issues, the configuration according to the present exemplary embodiment can obtain the advantageous effect of setting an appropriate light quantity for each type of recording media to be used and reducing a time for image analysis and data correction, while obtaining a higher accuracy of reading a test pattern. The occurrence of a failure in an image to be printed can consequently be prevented. In addition, a waiting time until the reading result is reflected can be reduced.

Since image capturing and update processing on the light quantity adjustment amount are carried out while the light quantity adjustment is performed, printing is continuously performed while the dynamic print position adjustment is executed. It is thereby possible to continue the printing operation with a high printing quality for a long period of time, while suppressing an increase in time for image analysis.

While the exemplary embodiment described above illustrates an example where the process (step S200) for determining whether to update the light quantity adjustment amount is executed for each recording medium P, the present disclosure is not limited to this example. If a printing instruction in a single print job is issued for recording media of the same type, the determination process may be performed once for each print job. Even in a case where an image is printed on various types of recording media in a single print job, the ground color on the m(<n)-th recording medium preceding the n-th recording medium, which is the same type as the recording medium on which the test pattern is printed and on which the test pattern is printed, may be read, and it may be determined whether to update the light quantity adjustment amount.

The test pattern to be printed is not limited to the print position adjustment pattern. An ejection failure detection pattern for detecting a failure in a printing element, a test pattern for gray scale correction, or the like may also be used.

In the light quantity adjustment amount update process in steps S310 to S330 described above, the non-printing area on the recording medium P is read and the light quantity is adjusted if the type information is different from the stored type information. However, the present disclosure is not limited to this configuration. For example, the light quantity adjustment may be executed by skipping the non-printing area reading control process, if the light quantity adjustment amount corresponding to the type of the recording medium P to be printed is stored in advance.

Other Exemplary Embodiments

While the above-described exemplary embodiment illustrates an example where the printing unit 3 includes the plurality of printheads 30, the printing unit 3 may include a single printhead 30. Each printhead 30 is not limited to a full-line head, but instead may be a serial head that forms an ink image by ejecting ink from the printhead 30 while moving the carriage on which the printhead 30 is detachably mounted in the Y-direction.

The printing apparatus to which the present disclosure can be applied is not limited to the printing apparatus that prints an image by applying ink. The recording material is not limited to ink. An electrophotographic printing apparatus that prints an image by applying toner may also be used.

The mechanism for conveying the recording medium P may have another configuration such as a configuration for conveying the recording medium P while the recording medium P is nipped between a roller pair. In the configuration for conveying the recording medium P by the roller pair, a roll sheet may be used as the recording medium P and the roll sheet may be cut after the transfer process to produce the printed matter P'.

In the above-described exemplary embodiments, the transfer member 2 is provided on the outer peripheral surface of the transfer drum 41, but instead may have another configuration. For example, the transfer member 2 may be formed in an endless belt shape and may be configured to run cyclically.

According to an exemplary embodiment of the present disclosure, it is possible to appropriately adjust the quantity of light for reading a test pattern, and thus it is possible to prevent an increase in the number of processes for analyzing read data obtained by reading the test pattern.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. A printing apparatus comprising:

a recording unit configured to record a pattern by applying a recording material to a recording medium conveyed as an n-th sheet of the recording medium, n being a natural number that satisfies m<n, m being another natural number;

an acquisition unit configured to acquire pattern data by reading, by using a reading unit, reflected light of light irradiated to the pattern from a light source; and an adjustment unit configured to adjust either one, or both, of a quantity of the light irradiated from the light source and a quantity of light for reading the pattern by the reading unit, based on characteristics acquired by reading a ground color of an m-th sheet of the recording medium, m being the another natural number mentioned above.

2. The recording apparatus according to claim 1, wherein the adjustment unit adjusts the quantity of the light irradiated from the light source by changing either one, or both, of a light emission time and a light emission intensity of the light source.

3. The recording apparatus according to claim 1, wherein the adjustment unit adjusts the quantity of light for reading the pattern by the reading unit by changing an exposure time of the reading unit.

4. The recording apparatus according to claim 1, further comprising:

a storage unit configured to store type information indicating a type of the recording medium, wherein, in a case where type information indicating the type of the recording medium included in a job is identical to the type information stored in the storage unit, the adjustment unit does not perform adjustment of the quantity of light for reading the pattern.

5. The recording apparatus according to claim 1, wherein the storage unit is configured to store type information indicating a type of a recording medium prepared by a user.

6. The recording apparatus according to claim 1, further comprising:

a conveyance unit configured to convey the recording medium in a conveyance direction, wherein the reading unit is disposed downstream of the recording unit in the conveyance direction.

7. The recording apparatus according to claim 1, wherein the reading unit is a charge-coupled device (CCD) sensor.

8. The recording apparatus according to claim 1, wherein a plurality of recording elements is disposed in the recording unit in a direction intersecting with a conveyance direction in which the recording medium is conveyed.

9. The recording apparatus according to claim 8, wherein the recording unit applies ink as the recording material.

10. The recording apparatus according to claim 1, wherein the pattern is a recording position adjustment pattern for adjusting a position where the recording material is applied to the recording medium, and wherein, based on pattern data of reading the recording position adjustment pattern, the recording unit controls a timing of applying the recording material.

11. A control method for a recording apparatus including a recording unit, an acquisition unit, and an adjustment unit, the control method comprising:

recording a pattern, by the recording unit, by applying a recording material to a recording medium conveyed as an n-th sheet of the recording medium, n being a natural number that satisfies m<n, m being another natural number;

acquiring pattern data, by the acquisition unit, by reading, by using a reading unit, reflected light of light irradiated to the pattern from a light source;

adjusting, by the adjustment unit, either one, or both, of a quantity of the light irradiated from the light source and a quantity of light for reading the pattern by the reading unit, based on characteristics acquired by reading a ground color of an m-th sheet of the recording medium, m being the another natural number mentioned above.

12. A non-transitory computer-readable storage medium storing a program causing a computer to execute a control method for a recording apparatus including a recording unit, an acquisition unit, and an adjustment unit, the control method comprising:

recording a pattern, by the recording unit, by applying a recording material to a recording medium conveyed as an n-th sheet of the recording medium, n being a natural number that satisfies $m<n$, m being another natural number;

acquiring pattern data, by the acquisition unit, by reading, by using a reading unit, reflected light of light irradiated to the pattern from a light source;

adjusting, by the adjustment unit, either one, or both, of a quantity of the light irradiated from the light source and a quantity of light for reading the pattern by the reading unit, based on characteristics acquired by reading a ground color of an m-th sheet of the recording medium, m being the another natural number mentioned above.

* * * * *